United States Patent [19]

Kasubuchi et al.

[11] 4,015,267

[45] Mar. 29, 1977

[54] INK JET PRINTER HAVING AIR RESISTANCE DISTORTION CONTROL

[75] Inventors: Takeshi Kasubuchi, Nara; Kaoru Ozawa, Yamatokoriyama; Tomoo Makita, Nara, all of Japan

[73] Assignee: Sharp Kabushiki Kaisha, Osaka, Japan

[22] Filed: July 19, 1973

[21] Appl. No.: 380,571

[52] U.S. Cl. .......... 346/1; 346/75

[51] Int. Cl.$^2$ .......... G01D 18/00

[58] Field of Search .......... 346/75

[56] References Cited

UNITED STATES PATENTS

| | | | |
|---|---|---|---|
| 3,631,511 | 12/1971 | Keur et al. | 346/75 |
| 3,827,057 | 7/1974 | Bischoff et al. | 346/75 |

*Primary Examiner*—Joseph W. Hartary
*Attorney, Agent, or Firm*—Birch, Stewart, Kolasch and Birch

[57] ABSTRACT

In ink jet system printers of charge amplitude controlling types ink drops issuing from a nozzle and rapidly traveling in their path toward a record receiving member are subjected to air resistances. Particularly the individual charged ink drops serving for printing purposes are under influences of air resistances which are different in accordance with the presence and absence of preceding charged ink drops and such differences result in faulty printing.

In order to minimize the occurrence of distortions in the recording as described above the control system disclosed herein produces correction signals in accordance with the conditions of presence charged and absence of the preceding ink drops to adjust the amplitude of charges on the individual ink drops, thereby obviating the distortions in the recording due to the air resistances.

15 Claims, 8 Drawing Figures

FIG. 2
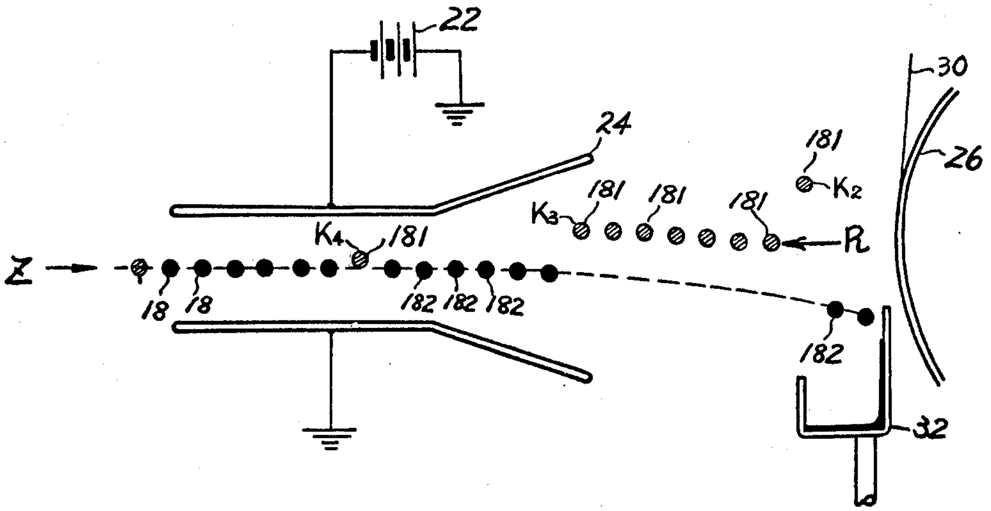
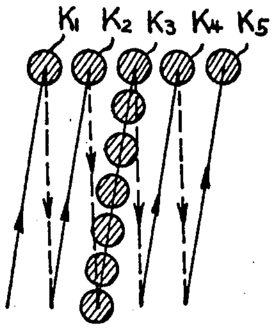
FIG. 3A
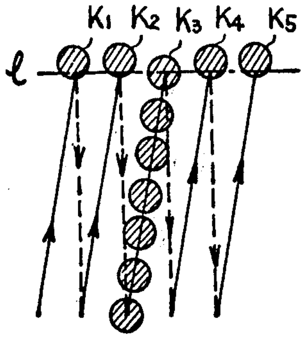
FIG. 3B

FIG. 4
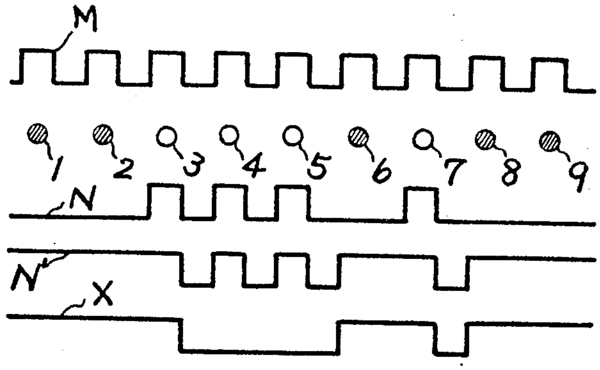
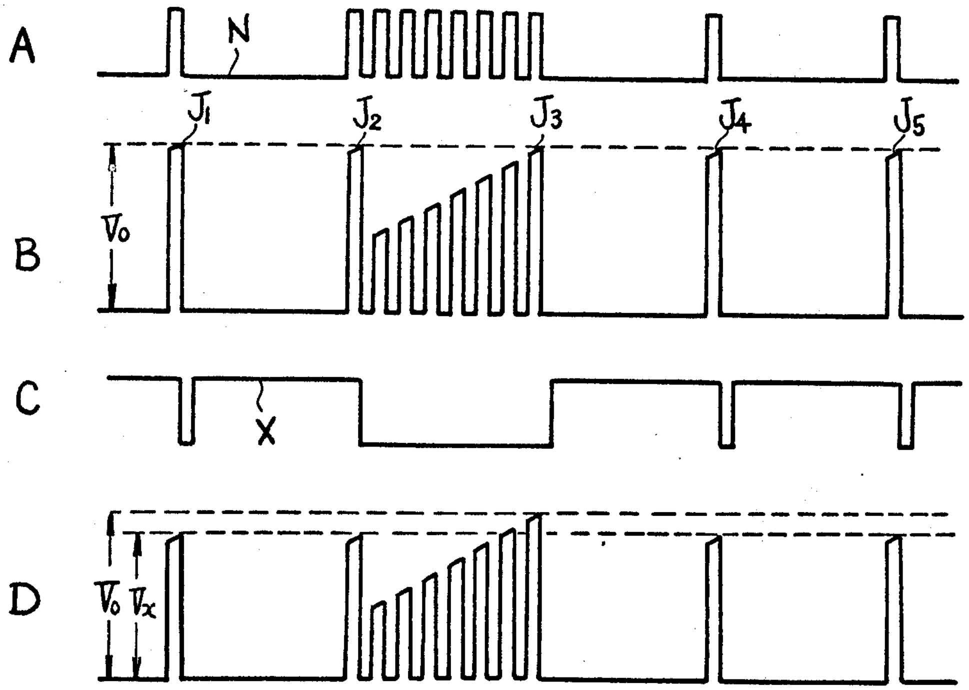
FIG. 5

INK JET PRINTER HAVING AIR RESISTANCE DISTORTION CONTROL

BACKGROUND OF THE INVENTION

This invention relates to an ink jet system printer wherein ink drops issuing at a constant rate from a nozzle are charged in accordance with charging signals and then deflected in accordance with the charges carried by the drops as they pass through a fixed electric field, thereby to form images representative of input signals, and more particularly to an improved printer and its associated control circuit system for minimizing the occurrence of printing distortions due to air resistances acting on the charged ink drops in their path toward the record receiving member.

In a U.S. Pat. No. 3,596,275 granted to Richard G. Sweet there is disclosed an ink jet system printer of the charge amplitude controlling type wherein ultrasonic vibration is applied to ink fluid issuing under pressure from a nozzle to form ink drops at a predetermined rate and the ink drops are charged in accordance with the charging signals and then the charged ink drops are electrostatically deflected to modify their respective trajectories in accordance with the amplitude of the charges on the drops so that symbols corresponding to the charging signals are recorded on a record receiving member such as paper.

In such charge amplitude controlling type of ink jet system the ink drops issuing from the nozzle and traveling toward the record receiving member are under the influence of air resistance. The air resistances having the influence on individual charged ink drops are dependent upon the trajectories of the preceding charged ink drops and the spacing away from the preceding charged ink drops. In particular, since the trajectories of the charged drops serving for printing purposes are varied, the air resistance values exerted on these charged drops are varied and this variation depends upon the presence or absence of charged drops immediately preceding them. Moreover, the differences in the air resistance are remarkable especially in the case of high velocity printing where the ink drops are rapidly traveling. These differences in the air resistance value appear as the extent of deflection on the record member and cause the faulty printing.

OBJECTS AND SUMMARY OF THE INVENTION

An object of this invention is the provision of an ink jet printer capable of alleviating printing distortions developed from differences in air resistance acting on the individual writing (charged) ink drops in their respective trajectories path.

Another object of this invention is the provision of an ink jet type printer and its associated electric control system which produces correction signals in accordance with the presence and absence of the writing (charged) ink drops and controls the amplitude of charges on the succeeding writing (charged) ink drops in response to the correction signals.

Still another object of this invention is the provision of circuit arrangement suitable to form correction signals which serve to control the amplitude of charges carried by the individual charged ink drops in accordance with the conditions of immediately presence and absence of preceding writing charged ink drops.

To eliminate the recording distortions due to air resistance, in accordance with this invention, there is provided a control circuit system which determines previously the presence and absence of preceding deflected (charged) ink drops and then produces correction signals in the light of results of such determinations so as to correct and control the amplitude of charges on the ink drops serving the writing function.

An ink charging technique disclosed in a U.S. Pat. No. 3,562,757 teaches provision of guard drops between the writing drops which act as a shield to minimize the adverse affects of drop charge repulsion, but no care being taken to eliminate the printing distortions caused by air resistance influencing on the ink drops in their path. In a U.S. Pat. application Ser. No. 35650 to Keur et al., filed May 8, 1970, now U.S. Pat. No. 3,631,511. to which the corresponding Japanese application No. 25588/71 has been laid to public inspection, there has been disclosed an arrangement wherein charges of high amplitude enough to minimize effects of the ink drops on charges carried by their succeeding ink drops are applied to these succeeding ink drops. In this instance attention is also directed to electric effects between the ink drops, or more specifically the electric effects at the instant of drop separation, but no consideration is made as to air resistance having influence on the ink drops in their path toward the recording member. As previously pointed out, printing distortions due to difference in air resistance influencing the movements of the ink drops in their path are matters of the importance in high velocity printing.

These and other objects of this invention are achieved, in a preferred form, by a circuit arrangement where the presence and the absence of the preceding deflected (charged) ink drops and, if desired, the spacing between the preceding deflected ink drops and the newly formed ink drops to be charged are sensed with the use of character signals superimposed on the charging signals for applying charges to the ink drops, and then the correction signals are provided in accordance with results of the sensing function to effect gain control of a charging signal amplifier thereby adjusting the amplitude of charges selectively applied to the ink drops to preclude distortion of their trajectories and obviating the faulty printing.

BRIEF DESCRIPTION OF THE DRAWING

FIG. 2 is an enlarged sectional view showing various conditions in a stream of charged and uncharged ink drops.

FIGS. 3(A) and 3(B) are graphic representations showing normal and distorted printing patterns of a large letter "T", respectively.

FIG. 4 is a waveform diagram showing relations between various output signals from the respective circuit components shown in FIG. 1 and a stream of ink drops.

FIG. 5 is a waveform diagram showing various output signals from the circuits shown in FIG. 1 in accomplishing the record of the large letter "T".

DISCRIPTION OF THE PREFERRED EMBODIMENTS

Figure 1:
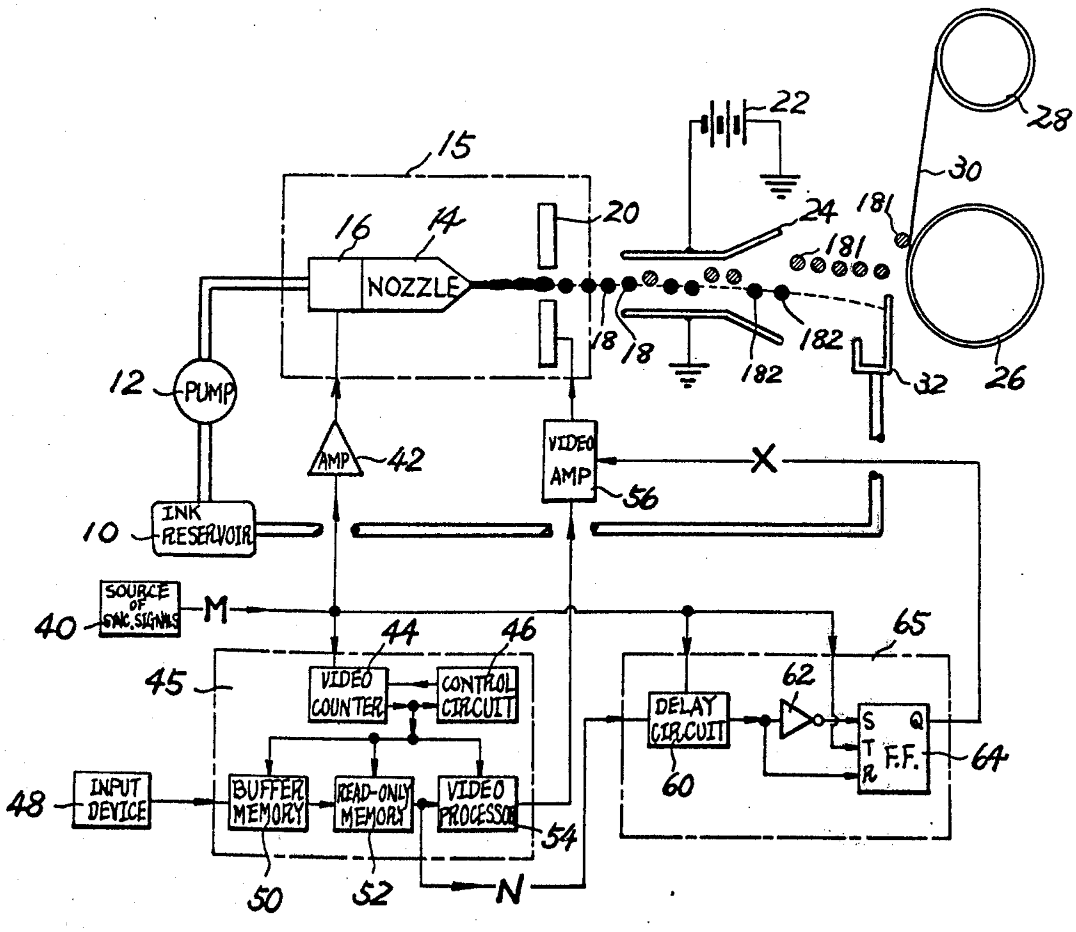
FIG. 1 is a schematic circuit diagram showing one embodiment of this invention.

Referring to FIG. 1 illustrating one embodiment of this invention, there is shown an ink jet drop printing system of the charge amplitude controlling type wherein ink liquid within an ink reservoir 10 is sent into a nozzle 14 under pressure by means of a pump 12 and then emitted from the nozzle 14. At this time an ultrasonic transducer 16 vibrates the nozzle 14 and more specifically the issuing ink liquid so that the stream of ink breaks up into a stream of ink drops 18 created at a rate identical with the vibration frequency. The individual ink drops 18 are traveling in a stream from the nozzle 14 toward the surface of a record receiving member 30. With the use of a charging electrode 20, the ink drops 18 are charged in accordance with charging signals and then deflected electrostatically in accordance with the amplitude of charges thereon which correspond to intelligence signals to be recorded, as they pass between a pair of deflection plates 24 having a constant high voltage electric field 22 applied therebetween. Afterward, the deflected ink drops 181, 181 are deposited on the record receiving member 30 extending between a pair of drums 26, 28 to provide a visual imprinted representation of symbols corresponding to intelligence signals.

In operation of the printer the ultrasonic transducer 16 is excited at all times thereby to issue the ink drops 18 from the nozzle 14 in a continuous stream. The ink drops 182 having no charges, hence, the ink drops not performing the printing function, impinge on a screen 32 and are returned back to the ink reservoir 10.

Vertical deflection of the ink drops 18 is accomplished by the above mentioned electrostatic deflection while deflection in a horizontal direction is effected in such a manner that a printing head 15 carrying the nozzle 14, the ultrasonic transducer 16, the charging electrodes 20, etc., is relatively advanced at a constant rate with respect to the recording member 30 as is well known in the art.

Consider in further detail the ink drops 18 emitted from the nozzle 14 in the operation principle of ink drop printing systems. As graphically represented in FIG. 2, within the ink drops 18, 18 travelling in the direction Z, the ink drops 182 not charged by means of the charging electrode 20 are not electrostatically deflected so that they impinges on the screen 32 and are returned to the reservoir 10 without reaching the record paper 30. On the other hand, the ink drops 181, 181 charged by means of the charging electrodes 20 are under the influence of the electric field caused between the deflection plates 24, with the results that they are deflected and then impinge on the record paper 30 to enable printing of symbols.

In the process of such printing, the individual ink drops 18 are influenced in their path by the air resistance R and particularly movements of the charged ink drops 181 serving the function of printing are affected by the air resistance R which varies greatly depending on the presence and absence of charged preceding deflected ink drops and the spacing away from the charged preceding deflected ink drops. Such difference in the air resistance causes variations in the deflection with the results of faulty printing. The difference in the air resistance increases considerably in the case where the ink drops are rapidly traveling. This is a serious problem for high velocity printing.

For instance, referring to FIG. 2, the air resistance R acting on the ink drops K2, K4 which are not immediately preceded by any of the charged deflected ink drops is higher than that acting on the ink drop K3 which is immediately preceded by a number of the charged deflected ink drops and deflection distortions become larger with increase of the air resistance R. In other words, deflection distortions due to the air resistance are relatively severe for those charged ink drops flying alone without immediately preceding charged ink drops. Such deflection distortions caused by the influence of air resistance R acting on the charged ink drops 181 (those for printing purposes) appear as printing distortions on letter patterns. For example, in case of printing a large letter T composed of an array of seven dots × five dots, in the absence of the deflection distortions, the letter T may be printed in a desired pattern as illustrated in FIG. 3(A). In the presence of the deflection distortions, however, the ink drops K1, K2, K4, K5 which are immediately preceded by the deflected ink drops 181 will be displaced upward from the normal printing line *l* and thus the letter T will not be written in the desired pattern. This condition is illustrated in FIG. 3(B).

As set forth above, a primary object of this invention is to avoid the printing distortions caused by these differences in air resistance acting on those ink drops charged and deflected for writing purposes.

Referring now back to FIG. 1, a control circuit system embodying this invention will be described in detail.

In this drawing 40 represents a master oscillator having an oscillation frequency of 25 KHz the output signals M of which are amplified and shaped in an amplifier circuit 42 and then applied to the ultrasonic transducer 16 tightly attached to the nozzle 14. As a result of this, the nozzle 14 vibrates to form the ink drops 18, for example, 25000 drops per second. The output signals M also are introduced into a video counter 44 within charging signal generator means 45 and into correction signal generator means 65 to be described later. The video counter 44 counts the output signals M from the oscillator 40, namely, the number of the ink drops 18. In this example of printing writing characters each composed of seven dots in a longitudinal direction and five dots in a lateral direction, this counter 44 is of radix 35. Start timings of the counting mode are controlled by a printing control circuit 46.

Information to be written in the printer system is converted into electric signals with the use of an input device 48 such as a tape recorder and sent via a buffer memory 50 into a read-only memory 52, which in turn produces a series of ink drop controlling pulses (or a character signal N) to be applied to a video generator circuit 54. The video generator circuit 54 comprises a deflection signal generator triggered upon the appearance of every seventh output from the video counter 44, and a diode analog gate (not shown) thereby sampling the deflection signals in response to the series of the ink drop controlling pulses. A video amplifier 56 provided with gain control amplifies such sampled character pattern information to approximately 150 volts (peak-to-peak) and the amplified outputs are applied as the charging signals to the charging electrode 20.

The character signals from the read-only memory 52 are entered into a delay circuit 60 within correction signal generator means 65 which aid in correcting the printing distortions due to the influence of air resistance. The delay circuit 60 is of the type where the exciting signals M for the ultrasonic transducer 16 are delayed in phase by 180°, and thus typically formed of an one bit delay flip-flop. A R-S-T type flip-flop 64 in the succeeding stage receives at its reset terminal R the outputs from the delay circuit 60 and at its set terminal S the same via an inverter 62. The Q outputs of the flip-flop 64 serve as the correction signals X arriving at the gain control in the foregoing video amplifier 56. The gain control may be carried out by any of means known to a person skilled in the art, for example, bias control.

The following is directed to the detailed description as to the above correction signal generator means 65 briefly explained. The number of the ink drops 1 . . . 9 issuing from the nozzle 14, as shown in FIG. 4, is theoretically equal to the frequency of the output signals M from the oscillator 40. The charging signals resulting from the character signal pulses N as modified at the output of the video processor 54 of FIG. 1 are applied via charging electrode 20 to the ink drops 3, 4, 5, 7 (See FIG. 4) which are necessary for the character pattern to be generated out of the continuously issuing ink drops 1 to 9 and the trajectories of these necessary ink drops 3, 4, 5, 7 are electrostatically deflected as previously described.

It is to be understood that detections of the occurrence of the pulses of the character signals N are caused to enable detections and measurements of the presence and the absence of preceding charged ink drops and the distances of a given drop to be charged from the preceding charged ink drops. The embodiment illustrated in FIG. 1 is arranged and constructed to effect a uniform correction even in the absence of a single charged ink drop immediately preceding an ink drop to be charged. With this arrangement, the character signals N are delayed by one bit with respect to the oscillation frequency and inverted in phase, and such delayed and inverted signals N' are applied to the flip-flop 64, which in turn delivers the correction signals X (shown in FIG. 4) from the output terminal Q thereof. THe correction signals X are introduced into the video amplifier 56 to change the bias voltage and to perform gain control.

Referring to the large character T shown in FIG. 3, the read only memory 52 generates the character signals N representative of the large character T as shown by A in FIG. 5 which are modified to the charging signals shown by B in FIG. 5 in the video generator 54 and, after such modification, are applied to the video amplifier 56. The individual pulses $J_1$ to $J_5$ of FIG. 5 correspond to the dots K1 to K5, respectively, and these pulse voltages are all at a certain deflection voltage Vo before correction.

In the meanwhile, the character signals N are entered into the correction signal generator means 65 which provides the correction signals X shown by C in FIG. 5 Consequently, the gain control is effected on the video amplifier 56 so that the voltages of the pulses J1, J2, J4, J5 having no preceding printing pulses will drop from Vo to Vx. It follows the correction on the amplitude of charges on the individual ink drops for the printing purposes.

Should the amplitude of charges on the ink drops K1, K2, K4, K5 which are not immediately preceded by any of the charged deflected ink drops be made smaller, the amount of electrostatic deflection will be smaller than the normal value. This will offset substantially the increased vertical deflection distortions due to air resistance thereby avoiding the printing distortions illustrated in FIG. 3B.

According to the embodiment of FIG. 1, even when one pulse of the character signals is lacking as compared with the output signals M from the oscillator 40, the correction is uniformly applied to the voltage amplitude of the charging signals to be applied to their succeeding ink drops without regard to the number preceding pulses omitted in the character signals, i.e. the number of the preceding ink drops having no charges thereon immediately preceding the ink drops currently to be charged. However, the larger the spacing from the preceding charged deflected ink drops, the greater the air resistance acting on the succeeding ink drops and also the greater the corresponding deflection distortions. It is preferable, for these reasons, that the amplitude of the charging signal (video signal) voltage occurring upon given character signal pulses be corrected or adjusted in proportion to the number of the absences of these preceding character pulses, namely, the extent of vacancy between two adjacent character signal pulses. This will give more satisfactory results, namely, a more accurate correction of the printing distortions.

Figure 6:
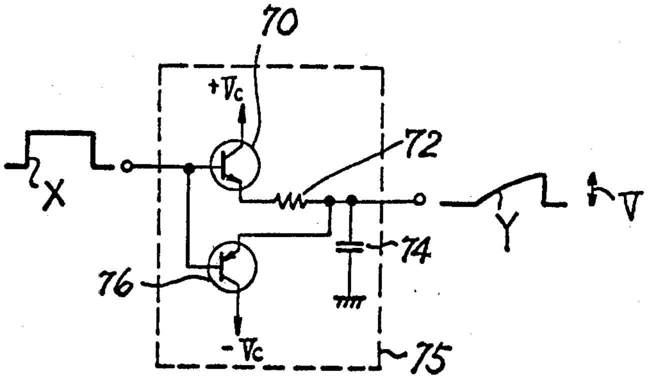
FIG. 6 is a circuit diagram showing a proportional correction signal generator.

With respect to FIG. 6, there is illustrated a circuit arrangement for practicing a proportional correction mode which includes proportion signal generator means 75 connected to the Q output terminal of the flip-flop 64 in FIG. 1. The proportion signal generator means 75 comprising an integration circuit wherein, when the correction signal X is at a high level, an NPN transistor 70 is rendered conductive to charge a capacitor 74 via a resistor 72; while, when the correction signal X is at a low level, a PNP transistor 76 is rendered conductive to discharge the capacitor 74. In this way there is provided a proportional correction signal, (the voltage amplitude of indirect proportion to with increasing the duration of the correction signal X. The application of the proportional correction signal $\gamma$ to the gain control means included within the video amplifier 56 in FIG. 1 results in provision of the proportional correction of charge amplitude on successive ink drops 18 issued from the nozzle 14 of FIG. 1.

Figure 7:
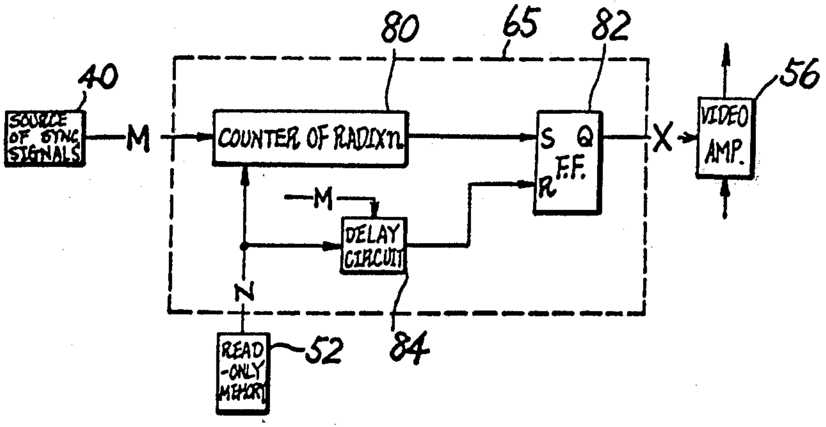
FIG. 7 is a schematic circuit diagram showing another embodiment of a correction signal generator.

FIG. 7 is a circuit block diagram showing a modification of the correction signal generator means 65 where the video signals (charging signals) occurring on the appearance of the various character pulses are corrected when there are the absences of a fixed number of the preceding pulses as compared with the exciting signals M for the ultrasonic transducer. The illustrated modification is suitable for use in systems, as disclosed in a U.S. Pat. No. 3,562,757, wherein the character signals are applied to alternate ink drops within a total of ink drops issuing from the nozzle in order to minimize the adverse effects of drop charge repulsion, and systems which need a lesser degreee of accuracy of the correction function.

In FIG. 7 the output signals M from the oscillator 40 are applied to an input terminal of a radix *n* counter 80 the reset terminal Re of which receives the character signals N from the read-only memory 52. The output terminal of the radix *n* counter 80 is connected to the set terminal S of an R-S flip-flop 82. The character signals N are introduced into a one bit delay circuit 84 which serves to delay the output signals N by one period of the output signals M from the oscillator, and its delayed outputs are entered into a reset terminal R of a flip-flop 82. The output terminal Q of the flip-flop 82 is connected to the gain control means within the video amplifier 56. With such construction the correction signals X occur to adjust the amounts of charges on the deflected ink drops only if more than $n$ character pulses are absent (normally $n = 3$ to 11).

As stated above, the circuit arrangement in accordance with this invention serves the function of previously detecting possible deflection distortions by means of its signal system to change and correct the amplitude of charges on the ink charged drops used for writing purposes. Therefore the modes of correction function may be all practiced in an electric signal system.

Although the printing head 15 carrying the nozzle 14, the ultrasonic transducer 16, the charging electrodes 20, etc., is advanced in a horizontal direction at a fixed rate in the above described embodiments, it may be fixed and, on the other hand, the drums 26, 28 feeding the recording paper 30 be moved in the horizontal direction as is well known in the art.

It should be noted, needless to say, that correction voltage amplitude of the correction signals to be so chosen as to cancel the deflection distortions due to the air resistance.

The air resistance factor which results in the printing distortion (the deflection magnitude) of the charged ink drops is illustrated by the following calculation of this distortion.

In making this calculation, it is assumed that a preceding charged ink drop is flying alone and a next following charged ink drop is in a vacuum, these assumptions being based on the concept that the preceding ink drop is affected by air resistance while its following ink drop is not.

The following parameters are considered in the analysis of printing distortions resulting from air resistance:

$m$: the mass of the ink drop
$q$: the charged amplitude on the ink drop
E: the deflecting electric field
$\eta$: the coefficient of viscosity of surrounding air
$a$: the radius of the ink drop
Vo: the flying velocity of the ink drop
$l$: the length of the deflection section
L: the distance from the end of the deflection section to the recording paper The deflection magnitude $x$ (air) of an individual ink drop in the air is calculated in accordance with the Stokes' law. In the expression, the ink drop is considered to be of spherical shape in the course of flight.

$$x(\text{air}) = -\frac{A}{B^2}\, ln(1 - BC) - \frac{AC}{B} + \frac{ACL}{v_o(1 - BC)} \quad (1)$$

$$\text{where } A = \frac{qE}{m},\ B = \frac{6\pi\eta a}{m},\ C = \frac{1}{V_o}$$

The deflection magnitude x (Vac) of the ink drop in the vacuum is:

$$x(\text{Vac}) = \frac{Eql}{mVo^2}\,(\tfrac{1}{2} L) \quad (2)$$

As an example, numerical values corresponding to an actual operating system are put into the expressions (1) and (2). The following values are represented in MKS system of units:

$m = 1.27 \times 10^{-9}$ kg
$q = 3.0 \times 10^{-12}$ coulomb
$E = 6.0 \times 10^5$ V/m
$\eta = 1.81 \times 10^{-5}$ N.S/m$^2$
$a = 3.5 \times 10^{-5}$m
$Vo = 18$ m/sec
$l = 2.8 \times 10^{-2}$m
$L = 2.0 \times 10^{-2}$m From the expressions (1) and (2)

$$x\ (\text{air}) = 4.21778 \times 10^{-3}\text{m}$$

$$x\ (\text{Vac}) = 4.16452 \times 10^{-3}\text{m}$$

and the difference between the two deflection magnitudes is:

$$x\ (\text{air}) - x(\text{Vac}) = 0.05326 \times 10^{-3}\text{m}$$

It should be noted that this value exceeds the radius of the ink drop. From this it is obvious how the air resistance factor effects the printing distortions.

We claim:

1. A method obviating air resistance distortion of ink drop trajectories in an ink drop recording system wherein character signals are applied to ink drop charging means for applying a charge of predetermined amplitude to selected ones of a plurality of ink drops travelling in a stream to constrain predetermined trajectories on said charged ink drops, said method comprising the steps of:

sensing the presence of one or more uncharged ink drops immediately preceeding the next ink drop to be charged to anticipate air resistance distortion of the trajectory of said next ink drop to be charged; and adjusting the amplitude of the charge to be applied to said next ink drop to be charged as a function of the presence of one or more of said uncharged ink drops to obviate the anticipated distortion from air resistance of the resulting trajectory of said charged ink drop.

2. An ink drop printing system comprising:

means for issuing a stream of ink drops toward a recording surface; means selectively charging predetermined ones of said ink drops in varying magnitudes in accordance with intelligence signals to be recorded;

means for deflecting those of said ink drops so charged, into trajectories corresponding to the magnitude of such charge;

means detecting the absence of charged ink drops in said stream immediately preceeding an ink drop next to be charged;

each trajectory of a given ink drop being subjected to distortion from air resistance as a function of the absence of one or more charged ink drops immediately preceeding said given ink drop; and correction means responsive to said detecting means and constraining said charging means to modify said charge magnitudes on each of said predetermined ones of said ink drops not immediately preceded by one or more charged ink drops to compensate said trajectories of the former for said distortion from air resistance.

3. An ink drop printing system as set forth in claim 2 wherein the issuing means comprises:

a nozzle emitting ink liquid under pressure, means for affording ultrasonic vibrations to the nozzle and forming the ink drops, and said charging means includes video amplifier means responsive to said intelligence signals and said correction means and a charging electrode for charging the ink drops in accordance with the intelligence signals, driven by said video amplifier means.

4. An ink drop printing system as set forth in claim 3 wherein the charging electrode receives from said video amplifier means charging signals representative of the intelligence signals modified by said correction means indicative of the conditions of the presence and absence of preceding charged ink drops for a given ink drop to be charged, causing the amplitude of the charging signals applied to a given ink drop by said charging electrode to be substantially adjusted in response to said correction means.

5. An ink drop printing system as set forth in claim 2 wherein the deflecting means comprises a pair of deflection electrodes between which a fixed electric field is applied.

6. An ink drop printing system comprising:

a nozzle emitting ink liquid, a source of exciting signals, transducer means constraining the nozzle to form a series of ink drops in response to said exciting signals and coincident therewith;

charging signal generator means providing character signals corresponding to intelligence signals to be recorded and then providing charging signals in accordance with the character signals, correction signal generator means responsive to successive absences of said character signals as compared with the occurrences of said exciting signals for said transducer and said nozzle and providing correction signals as a function thereof, gain control means in said correction signal generator means correcting the voltage amplitude of the charging signals in response to said correction signals, a charging electrode receiving said corrected charging signals and charging the ink drops in accordance with said corrected charging signals, means for deflecting the charged ink drops in accordance with the amplitude of charges on the individual ink drops, and a record receving member on which the charged and deflected ink drops are deposited to form a record representative of said intelligence signals.

7. A control circuit system for use in an ink drop printing system wherein ink drops from a nozzle are formed in synchronism with exciting signals for the nozzle and charging signals including character signals to be recorded are applied to ink drop charging means for applying a charge to selected ones of said ink drops to be used for recording purposes, said control circuit system comprising:

detector means for detecting the presence and the absence of the character signals to thereby determine the charged or uncharged conditions of the ink drops immediately preceeding the next drop to be charged for recording purposes, as compared with the coincident presence of an exciting signal, for each ink drop thereby to provide correction signals in the absence of one or more of said charged ink drops, and correction means for adjusting the voltage amplitude of the charging signals in accordance with the correction signals from the detector means.

8. A control circuit as set forth in claim 7 wherein the detector means comprises a flip-flop responding to both the character signals and the exciting signals.

9. A control circuit as set forth in claim 7 wherein the correction means comprises a video amplifier generating said charging signals and driving a charging electrode therewith in response to said character signals and gain control means for said amplifier responsive to said correction signals to thereby vary the amplitude of said charging signals.

10. An ink drop printing system including a nozzle emitting a stream of ink liquids; an electromechanical transducer exciting said nozzle to form a stream of ink drops; an exciting signal generator continuously driving said transducer at a rate coincident with and determinative of the rate of recurrence of said ink drops in said stream; a character signal generating means providing character signals occurring concurrently with predetermined ones of said ink drops; charging signal generating means responsive to said character signals and including a charging electrode to electrostatically charge said selected ones of said ink drops with predetermined voltage amplitudes dictated by said charging signals; deflecting means imparting various trajectories on said selected ones of said ink drops as a function of said voltage amplitudes; a record receiving means impinged by said selected ones of said ink drops to form a printed record representative of said character signals;

said trajectory of a given charged ink drop being distorted as a result of the absence of one or more charged ink drops immediately preceeding said given ink drop, whereby said printed record is also distorted; and means precluding such distortion of said printed record comprising:

correction signal generator means providing correction signals in response to the absence of said character signals in the presence of said exciting signals;

gain control means in said charging signal generating means controlling the voltage amplitude of said charging signals; and circuit means applying said correction signals to said gain control means to control said voltage amplitude of a charging signal applied to said given ink drop to control the trajectory thereof and obviate the effect of said distortion thereon and preclude distortion of said printed record.

11. An ink drop printing system as set forth in claim 10, wherein said correction signals are of a duration directly proportional to the number of uncharged ink drops between a first charged ink drop and the next ink drop to be charged; and wherein said circuit means applying said correction signals to said gain control means comprises proportioning signal generator means responsive to said correction signal and providing a proportioning signal to drive said gain control means; said proportioning signal having an amplitude varying in substantially direct proportion to said duration of said correction signal.

12. An ink drop printing system as set forth in claim 11 wherein the proportioning signal generator means comprises an integration circuit.

13. An ink drop printing system as set forth in claim 10 wherein the formed record is composed of a matrix array.

14. An ink drop printing system comprising:

means for issuing ink drops toward a recording surface, the ink drops being charged in accordance with intelligence signals to be recorded, means for deflecting the charged ink drops, and means for correcting the amplitude of charges on certain ink drops in accordance with the conditions of their preceding ink drops by modifying the amplitude of charges on the certain ink drops not having preceding charged ink drops thereby to obviate differences in air resistance acting on the individual ink drops.

15. An ink drop printing system comprising:

means for issuing ink drops toward a recording surface, the ink drops being charged in accordance with intelligence signals to be recorded, means for deflecting the charged ink drops, and means for correcting the amplitude of charges on certain ink drops in accordance with the conditions of their preceding ink drops by reducing the amplitude of charges on said certain ink drops not having preceding charged ink drops thereby to obviate difference in air resistance acting on said certain individual ink drops.

* * * * *